United States Patent
Kalygin et al.

(10) Patent No.: US 11,527,973 B2
(45) Date of Patent: Dec. 13, 2022

(54) METHOD FOR STARTING A SYNCHRONOUS MOTOR

(71) Applicant: ABB Schweiz AG, Baden (CH)

(72) Inventors: Andrey Kalygin, Würenlingen (CH); Christian Stulz, Zurich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/071,048

(22) Filed: Oct. 15, 2020

(65) Prior Publication Data

US 2021/0111647 A1   Apr. 15, 2021

(30) Foreign Application Priority Data

Oct. 15, 2019 (EP) .................................. 19203213

(51) Int. Cl.
*H02P 6/06* (2006.01)
*H02P 6/28* (2016.01)
(Continued)

(52) U.S. Cl.
CPC ............... *H02P 6/06* (2013.01); *H02K 3/28* (2013.01); *H02P 6/20* (2013.01); *H02P 6/28* (2016.02);
(Continued)

(58) Field of Classification Search
CPC .. H02P 21/22; H02P 21/18; H02P 6/20; H02P 27/06; H02P 21/34; H02P 2205/01;
(Continued)

(56) References Cited

U.S. PATENT DOCUMENTS 6,791,293 B2 * 9/2004 Kaitani ..................... H02P 6/18
318/592
7,276,877 B2 * 10/2007 Qiu ....................... G05B 13/048
318/453

(Continued)

FOREIGN PATENT DOCUMENTS

CN          103270691 B      12/2016
CN          106208865 B       9/2018

OTHER PUBLICATIONS

European Patent Office, Extended Search Report issued in corresponding Application No. 19203213.4, dated Apr. 15, 2020, 16 pp.
(Continued)

*Primary Examiner* — Thai T Dinh
(74) *Attorney, Agent, or Firm* — Armstrong Teasdale LLP

(57) ABSTRACT

A method for starting a synchronous motor is provided. The synchronous motor includes a rotor for creating a first magnetic field and a stator with stator windings connected to an electrical energy converter for converting a supply voltage into a stator voltage to be applied to the stator windings to create a rotating second magnetic field interacting with the first magnetic field. The method includes applying reference stator voltages to the stator windings, where the reference stator voltages are determined from a reference current vector and a reference rotor speed, measuring stator currents, calculating an estimated rotor speed and rotor position from the applied stator voltages and the measured stator currents, calculating a speed error by subtracting the estimated rotor speed from the reference rotor speed, determining a reference torque producing current component from the speed error, and modifying the reference current vector with the reference torque producing current component.

18 Claims, 6 Drawing Sheets

(51) Int. Cl.
    *H02P 6/20*     (2016.01)
    *H02P 21/18*     (2016.01)
    *H02P 21/22*     (2016.01)
    *H02K 3/28*     (2006.01)

(52) U.S. Cl.
    CPC .............. *H02P 21/18* (2016.02); *H02P 21/22* (2016.02); *H02P 2205/01* (2013.01); *H02P 2205/07* (2013.01); *H02P 2207/05* (2013.01)

(58) Field of Classification Search
    CPC .......... H02P 2205/07; H02P 6/06; H02P 6/28; H02K 3/28
    See application file for complete search history.

(56) References Cited

U.S. PATENT DOCUMENTS

| | | | | |
|---|---|---|---|---|
| 7,772,790 | B2* | 8/2010 | Nashiki | H02P 25/08 318/400.02 |
| 8,330,403 | B2* | 12/2012 | Basic | H02P 21/18 318/434 |
| 9,154,065 | B2* | 10/2015 | Yamazaki | H02P 6/32 |
| 9,998,044 | B2* | 6/2018 | Tian | H02P 6/181 |
| 2003/0006723 | A1* | 1/2003 | Sul | H02P 21/24 318/127 |
| 2006/0119305 | A1* | 6/2006 | Lee | H02P 1/163 318/400.34 |
| 2010/0264861 | A1 | 10/2010 | Basic et al. | |

OTHER PUBLICATIONS

Tolochko et al., "Comparison of SPMSM Rotor Speed Estimation Techniques Based on the Flux Linkage Evaluation," 2019 IEEE 6th International Conference on Energy Smart Systems, Apr. 17, 2019, pp. 307-312.

Xiao et al., "A Sensorless Control Based on MRAS Method in Interior Permanent-Magnet Machine Drive," 2005 IEEE International Conference on Power Electronics and Drives Systems, Piscataway, New Jersey, Nov. 28, 2005, pp. 734-738.

Wang et al., "A Simple Startup Strategy Based on Current Regulation for Back-EMF-Based Sensorless Control of PMSM," IEEE Transactions on Power Electronics, vol. 27, No. 8, Aug. 2012, pp. 3817-3825.

* cited by examiner

METHOD FOR STARTING A SYNCHRONOUS MOTOR

FIELD OF THE INVENTION

The invention relates to the control of electrical drives. In particular, the invention relates to a method, a computer program and a computer-readable medium for starting a synchronous electrical machine as well as to a synchronous electrical machine with a controller adapted for performing such a method.

BACKGROUND OF THE INVENTION

A rotor position and speed of a synchronous motor, such as a permanent-magnet synchronous motor (PMSM), may be detected without using any sensors or encoders.

For starting a synchronous motor from standstill, a rotating stator current vector may be applied, which creates electromagnetic torque forcing the rotor to follow the stator current vector. Due to very weak natural damping of a synchronous motor, such kind of starting may result in speed oscillations of the rotor. Such oscillations should be avoided.

In general, additional damping of the rotor may be achieved by modifying the stator current vector in an appropriate way. Controlling of the stator current is usually implemented in an orthogonal coordinate system rotating with the rotor. Accordingly, the stator current vector may be modified by changing at least one of its components or by changing a frequency with which the coordinate system rotates, for example, with a predefined frequency profile.

Also, the startup procedure of the synchronous motor should be as short as possible. Typical algorithms may be capable of starting a synchronous motor within at least 3 seconds.

For example, U.S. Pat. No. 9,998,044 B2 describes a startup method for a three-phase sensorless permanent-magnet synchronous motor, where a rotor flux projection on the d- or q-axis of the rotating coordinate system is used to determine whether a stator current reference applied during startup is sufficient to spin the motor. The method can also determine an initial value for a stator torque current reference to use at the start of a closed-loop field-oriented control mode based on an angle difference between reference and estimated angles of the rotor.

US 2010/0264861 A1 describes a method for determining the position of the flux vector of an electric motor. As shown in FIG. 1, a speed error is calculated by subtracting an estimated rotor speed $\omega_r$ from a reference rotor speed $\omega_{ref}$ and a current vector $I_{qref}$ is determined from the speed error. FIG. 1 also shows that an angle $\theta_s$, which corresponds to an estimated position of the rotor flux vector, is determined by integrating an estimated stator speed $\omega_s$. The motor is controlled in such a way that a difference between the estimated position $\theta_s$ and a real position $\theta_R$ of the rotor flux vector is minimized.

CN 106208865 B describes a method for controlling multiple permanent magnet synchronous motors. FIG. 1 shows a control scheme where a speed error and a position error are calculated and used to control a motor.

CN 103270691 B describes a sensorless AC motor controller that uses feed-forward torque control (FFTC) in order to measure the angular position of the rotor. FIG. 3 shows a control scheme where an applied rotor speed ω' is determined using a load model 22 and an applied rotor position θ' is determined by integrating the applied rotor speed ω'. The applied rotor position θ' is used by a block 31 to generate stator voltages $v'_u$, $v'_v$, $v'_w$ for the motor 11 from applied current components $i'_d$, $i'_q$ and by a block 14 to determine measured values of the current components $i_d$, $i_q$ from measured stator currents of the motor 11. A difference $\Delta i_q$ between the applied torque generating current component $i'_q$ and the measured value of the current component $i_q$ can be calculated and used to correct the load model 22.

A further example for a sensorless vector control system is described by Xiao Xi et al. in: "A Sensorless Control Based on MRAS Method in Interior Permanent-Magnet Machine Drive", International Conference on Power Electronics and Drives Systems, Kuala Lumpur, Malaysia, 28 Nov. to 1 Dec. 2005, vol. 1, pages 734 to 738.

DESCRIPTION OF THE INVENTION

It is an objective of the invention to reduce speed oscillations during startup of a synchronous motor to a minimum, to reduce the startup time and to provide smooth changeover to a normal operation mode.

This objective is achieved by the subject-matter of the independent claims. Further exemplary embodiments are evident from the dependent claims and the following description.

A first aspect of the invention relates to a method for starting a synchronous motor fed by an electrical energy converter. The synchronous motor may comprise a rotor for creating a first magnetic field and a stator with stator windings connected to an electrical energy converter for converting a supply voltage into a stator voltage to be applied to the stator windings to create a rotating second magnetic field interacting with the first magnetic field. The rotor may have a permanent magnet and/or rotor windings to create the first magnetic field. The rotor may be rotatably mounted in the stator. The electrical energy converter may comprise a three-phase inverter for providing three-phase stator voltages from a DC link of the electrical energy converter. The stator voltages may be calculated by a controller for sensorless field-oriented control of the synchronous motor. The synchronous motor, i. e., an AC motor in which, at steady state, a rotation of the rotor is synchronized with a frequency of a supply current, may be part of an electric drive system comprising the electrical energy converter and a controller for controlling the synchronous motor dependent on a load.

The method may be automatically performed by the controller. With the method, the synchronous motor may be started in eight steps.

According to an embodiment of the invention, a first step of the method comprises: applying reference stator voltages to the stator windings, wherein the reference stator voltages are determined from a reference current vector and a reference rotor speed. The reference current vector may be determined from a reference current magnitude during starting. The reference current vector may be provided in an orthogonal coordinate system. The reference rotor speed may be an angular speed with which the rotor should spin. The rotating coordinate system may be an orthogonal coordinate system and may rotate with the rotor. The reference current vector may have two components referring to a rotor flux and a rotor torque. The reference current magnitude and the reference rotor speed may be varied during starting, for example, according to a predefined profile, which may be a ramping or stepping function or any other sort of appropriate function. The profile may also comprise a constant portion.

According to an embodiment of the invention, a second step of the method comprises: measuring stator currents in the stator windings. The stator currents may be measured by a control system of the electrical energy converter, e. g., with low-inductance shunt resistors of a current sensing and fault generation circuitry built into a three-phase inverter of the electrical energy converter. For example, the measured stator currents may be used for estimating a rotor flux. As the measured stator currents may be provided in a stationary three-phase coordinate system, the measured stator currents may be transformed in an orthogonal rotating coordinate system prior to estimating the rotor flux. The measured stator currents may also be used to calculate a reference voltage for controlling speed or torque of the synchronous motor in a closed-loop control mode.

According to an embodiment of the invention, a third step of the method comprises: calculating an estimated rotor speed and an estimated rotor position of the rotor from the applied stator voltages and the measured stator currents. The estimated rotor speed and the estimated rotor position may be calculated in a phase-locked loop from an estimated rotor flux. The stator voltages may be provided in the rotating coordinate system prior to estimating the rotor speed and rotor position and transformed in a stationary three-phase coordinate system.

According to an embodiment of the invention, a fourth step of the method comprises: calculating a speed error by subtracting the estimated rotor speed from the reference rotor speed. A speed error may be an error signal generated from a difference between the estimated rotor speed and the reference rotor speed.

According to an embodiment of the invention, a fifth step of the method comprises: determining a reference torque producing current component from the speed error and modifying the reference current vector with the reference torque producing current component. The speed error may be input to a PI controller which may output a reference current accordingly. Thus, the reference torque producing current component may be seen as an output of a PI controller for correcting the reference torque producing current component of the reference current vector. Additionally, the reference torque producing current component may be input to a limit controller to verify that the reference torque producing current component does not exceed an upper and/or lower current limit. For example, the current limit may be provided dependent on the reference current magnitude.

According to an embodiment of the invention, a sixth step of the method comprises: calculating a position error by subtracting the estimated rotor position from a reference rotor position, wherein the reference rotor position is determined from the reference rotor speed and a reference rotor speed correction, wherein the reference rotor speed correction increases and decreases with the position error, wherein the reference rotor speed correction is subtracted from the reference rotor speed to determine a corrected reference rotor speed and wherein the reference rotor position is determined by integrating the corrected reference rotor speed. In other words, the reference rotor speed correction may increase when the position error increases, and vice versa. For example, the increase of the reference rotor speed correction may be proportional to the increase of the position error, and vice versa.

According to an embodiment of the invention, a seventh step of the method comprises: correcting the reference current vector by transforming it by the position error into a corrected reference current vector, wherein a rotating coordinate system of the corrected reference current vector is aligned with the estimated rotor position. It is possible that the position error is set to zero when it falls below a predefined threshold value. In this case, the reference rotor position may be set identical with the estimated rotor position.

According to an embodiment of the invention, an eighth step of the method comprises: determining switching signals for the electrical energy converter from the reference stator voltages and applying the switching signals to the electrical energy converter. A switching signal may be a signal generated by pulse-width modulating phase voltages provided in a three-phase coordinate system. Such pulse-width modulating may be controlled with a space vector modulation algorithm implemented in the controller as hardware and/or software. For example, the switching signals may each be generated as a low-power input signal for a gate driver of the electrical energy converter. Alternatively, the switching signals may each be generated as a high-current output signal of such a gate driver. Such an output signal may then be applied to a gate of a transistor of a three-phase inverter connected to a DC link of the electrical energy converter.

According to an embodiment of the invention, the method further comprises: determining from the position error whether the estimated rotor position is accepted as correct or not; when the estimated rotor position is accepted as correct: using the estimated rotor position as the reference rotor position and changing a magnitude of the reference current vector to an initial value for normal operation of the electric drive system; and/or when the estimated rotor position is not accepted as correct: changing a magnitude of the reference current vector according to a predefined magnitude profile and/or changing the reference rotor speed according to a predefined rotor speed profile. For example, the estimated rotor position may be determined as correct when it reaches a desired minimum and as not correct as long as the desired minimum has not yet been reached. In the former, a value of the reference rotor position may be set to a value of the estimated rotor position, i. e., the position error may be set to zero. At normal operation of the electric drive system, the electrical energy converter may be controlled by closed-loop sensorless field-oriented control based on an external speed and/or torque reference signal, which may also be referred to as speed and/or torque control scheme. The initial value of the reference torque producing current component may be chosen such that smooth transition from the startup procedure to the speed or torque control scheme is ensured. For example, the initial value may be the most recent value of a reference torque producing current component calculated during the startup procedure. The magnitude of the reference current vector may be set to the initial value with a ramping or stepping function as soon as the estimated rotor position is determined as correct. In this way, smooth switching to the normal operation mode of the electric drive system may be achieved. Additionally or alternatively, the predefined magnitude profile may be a rising curve or a curve with a rising portion and a constant portion. A rising curve may be a linear or non-linear continuous curve. A constant portion may be a horizontal line of the curve.

According to an embodiment of the invention, an absolute value of the position error is compared to a predefined threshold value, wherein the estimated rotor position is accepted as correct when the absolute value of the position error stays below the threshold value for a predefined time period. The threshold value may be calculated or determined experimentally.

According to an embodiment of the invention, the method further comprises: determining a reference magnetizing current component from the reference torque producing component and a reference magnitude of the reference current vector and modifying the reference current vector with the reference magnetizing current component. A reference magnetizing current component may be seen as one of two components of the reference current vector, which affects motor magnetizing (main) flux.

According to an embodiment of the invention, the reference magnetizing current component is calculated with:

$$i_{sd}^{**} = \sqrt{I_s^{2*} - i_{sq}^{2**}}.$$

According to an embodiment of the invention, the reference rotor speed correction is determined from a product of the position error and a gain factor. For example, the gain factor may be set to zero when the position error stays below the threshold value for the predefined amount of time.

According to an embodiment of the invention, the reference torque producing component is determined dependent on a reference magnitude of the reference current vector. For example, the reference magnitude may be used to set the positive and/or negative limits of a limit controller for the reference torque producing current component.

According to an embodiment of the invention, the method further comprises: determining a reference voltage vector from the corrected reference current vector and the measured stator currents; transforming the reference voltage vector into a stationary three-phase coordinate system; determining the switching signals by pulse-width modulating phase voltages of the transformed reference voltage vector. For example, each of the components of the reference voltage vector may be an output signal of a PI controller. The output signal may be generated by amplifying an error signal resulting from a comparison of a component of the reference current vector with the measured stator currents. The reference voltage vector may be provided in a rotating orthogonal coordinate system.

A further aspect of the invention relates to a computer program which, when being executed on a processor, is adapted for performing the method as described above and below.

A further aspect of the invention relates to a computer readable medium in which such a computer program is stored. A computer-readable medium may be a floppy disk, a hard disk, a USB (Universal Serial Bus) storage device, a RAM (Random Access Memory), a ROM (Read Only Memory), an EPROM (Erasable Programmable Read Only Memory), or a FLASH memory. A computer readable medium may also be a data communication network, e. g. the Internet, which allows downloading a program code. In general, the computer-readable medium may be a non-transitory or transitory medium.

A further aspect of the invention relates to a controller for an electrical energy converter. The controller is adapted for performing the method as described above and below. For example, the controller may comprise a processor and a memory for storing the computer program. However, it also may be that the method is partially or completely implemented in hardware.

A further aspect of the invention relates to an electric drive system which comprises a synchronous motor with a rotor for creating a first magnetic field and a stator with stator windings. Furthermore, the electric drive system comprises an electrical energy converter connected to the stator windings and adapted for converting a supply voltage into a stator voltage to be applied to the stator windings to create a rotating second magnetic field interacting with the first magnetic field. The electric drive system also has a controller for controlling the electrical energy converter. The controller is adapted for performing the method as described above and below.

It has to be understood that features of the method as described above and below may be features of the electric drive system as described above and below.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
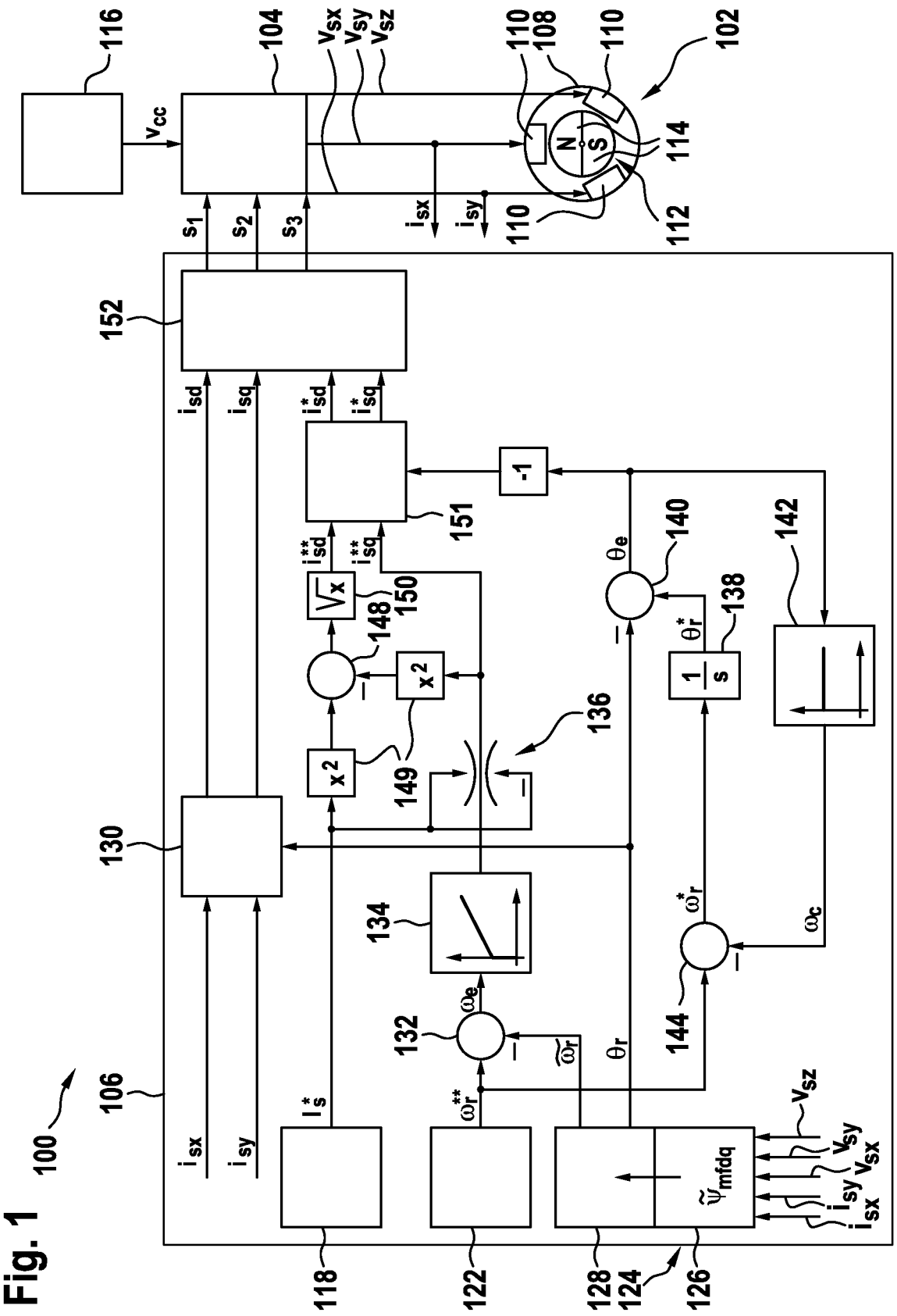
FIG. 1 schematically shows an electric drive system according to an embodiment of the invention.

FIG. 1 shows an electric drive system 100 with a synchronous motor 102, an electrical energy converter 104 and a controller 106. The synchronous motor 102, which may be a permanent-magnet synchronous machine (PMSM), comprises a stator 108 with stator windings 110 which are each connected to outputs of the electrical energy converter 104. A rotor 112 is configured to rotate within the stator 108. In order to create a first magnetic field, the rotor 112 comprises one or more permanent magnets 114 which may be mounted on and/or buried within the rotor 112. Additionally or alternatively, the rotor 112 may comprise a number of electrical windings to create the first magnetic field. The stator windings 110 are arranged around the rotor 112. The electrical energy converter 104 is connected to an electrical grid 116 providing an AC supply voltage $V_{cc}$. The electrical energy converter 104 is configured to convert the supply voltage $V_{cc}$ into a three-phase AC voltage in the form of three stator voltages $V_{sx}$, $v_{sy}$, $v_{sz}$ based on switching signals $s_1$, $s_2$, $s_3$, e. g., pulse-width modulation or space vector modulation signals, generated by the controller 106. The stator voltages $V_{sx}$, $V_{sy}$, $v_{sz}$ are applied to respective terminals of the stator windings 110. An electrical current through the stator windings 110 sets up a rotating second magnetic field within an air gap between the rotor 112 and the stator 108. The interaction between the two magnetic fields causes the rotor 112 to rotate, producing torque. The speed and torque of the synchronous motor 102 may be controlled by controlling the current through the stator windings 110.

The synchronous motor 102 may be controlled using field-oriented control (FOC) techniques without any sensors or encoders. In this case, the flux and torque components of the stator currents are controlled independently by the controller 106 based on a reference rotor speed $\omega_r^{**}$, which may be an external speed reference signal, and an estimated rotor position $\tilde{\theta}_r$, estimated based on a back electromagnetic force (back-EMF) calculated from quantities of the stator windings 110. This implies that the synchronous motor 102 must be rotating at a minimum speed for a sufficient amount of back-EMF to be detected by the controller 106 to accurately calculate the estimated rotor position $\tilde{\theta}_r$. Therefore, the controller 106 is configured to perform a startup procedure in order to start the synchronous motor 102 from zero speed.

Figure 3:
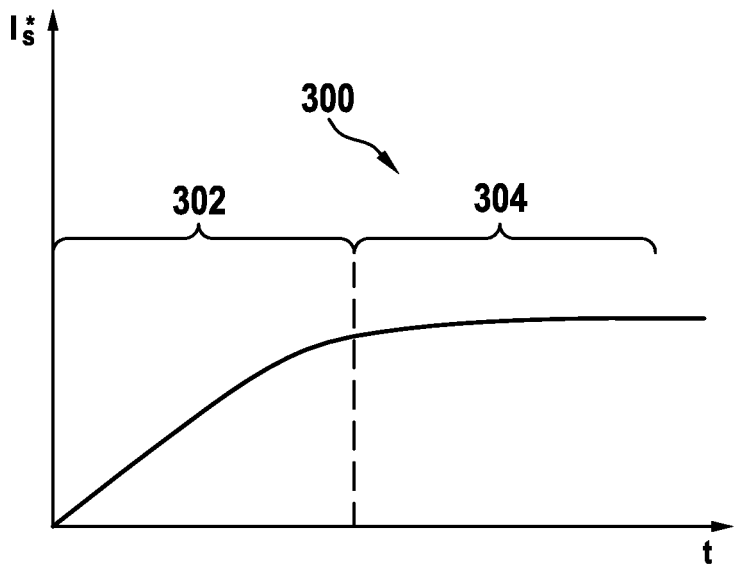
FIG. 3 shows a diagram of a predefined magnitude profile which may be used with the electric drive system from FIG. 1.

FIG. 1 depicts a block diagram of an algorithm implemented in the controller 106 for starting the synchronous motor 102 from standstill. During startup, a reference current generator 118 generates a reference magnitude $I_s^*$ for a reference current vector with a reference magnetizing component $i_s^{}$ and a reference torque producing component $i_{sq}^{}$. For example, the reference current generator 118 may output the reference magnitude $I_s^*$ according to a desired profile as shown in FIG. 3, which may be a ramping function ramping the reference magnitude $I_s^*$ up to a specified value and keeping it constant until the estimated rotor position $\tilde{\theta}_r$ is accepted as correct. The reference current generator 118 may then change the reference magnitude $I_s^*$ to a value defined as an initial value for a torque control mode.

Figure 4:
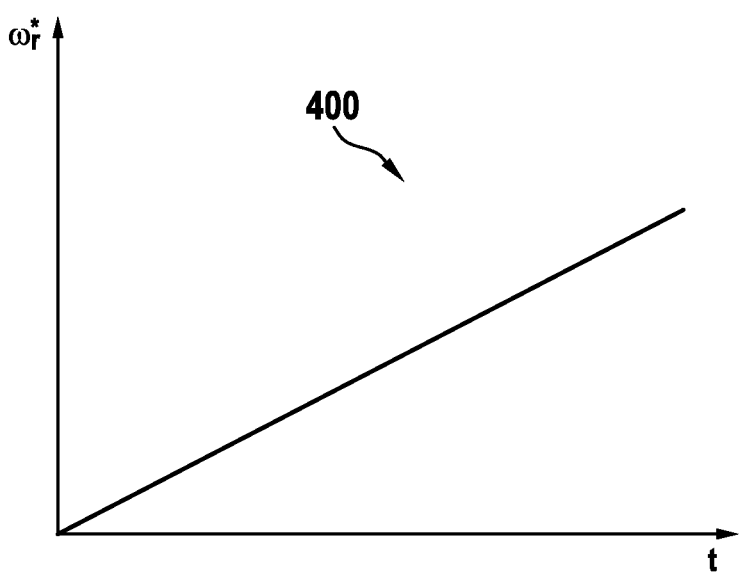
FIG. 4 shows a diagram of a predefined rotor speed profile which may be used with the electric drive system from FIG. 1.

A reference speed generator 122 generates a reference rotor speed $\omega_r^{}$ for the rotor 112. The reference rotor speed $\omega_r^{}$ may also be generated according to a desired profile, e. g., ramped up from a specified minimum value to a specified maximum value, as shown in FIG. 4.

Flux estimation is active from the very beginning of the startup procedure. An estimator block 124 comprises a rotor flux estimator 126 for calculating an estimated rotor flux $\tilde{\Psi}_{mfdq}$ and a rotor position estimator 128 for calculating the estimated rotor position $\tilde{\theta}_r$ and an estimated rotor speed $\tilde{\omega}_r$ based on the estimated rotor flux $\tilde{\Psi}_{mfdq}$. The estimated rotor position $\tilde{\theta}_r$ and/or the estimated rotor speed $\tilde{\omega}_r$ may be calculated in a phase-locked loop (PLL).

The estimated rotor flux $\tilde{\Psi}_{mfdq}$ is calculated based on the applied stator voltages $V_{sx}, V_{sy}, V_{sz}$ and stator currents $i_{sx}, i_{sy}$ measured in the stator windings 110. In the example illustrated in FIG. 1, only two phases $i_{sx}, i_{sy}$ of the stator current are measured, since a third phase may be calculated by the controller 106 based on the measurements of the other two phases $i_{sx}, i_{sy}$.

Figure 2:
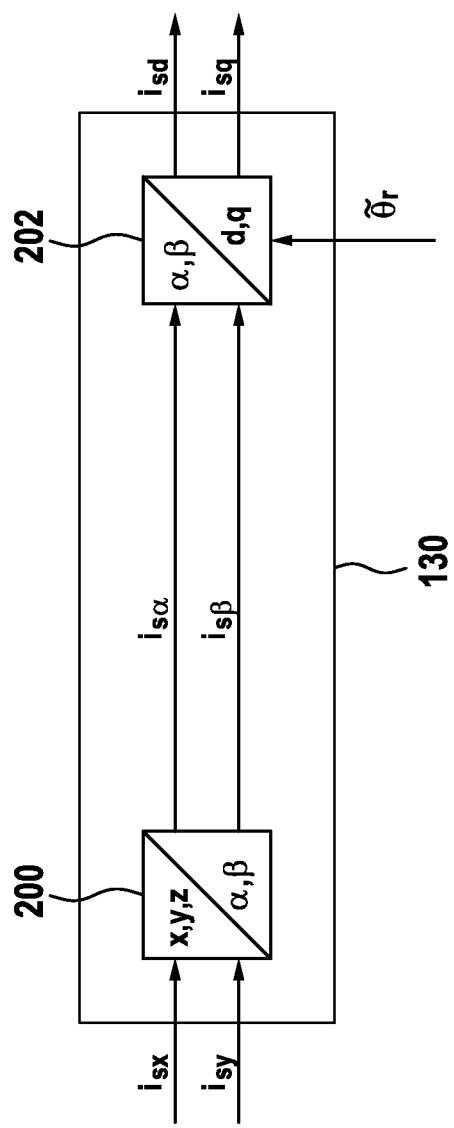
FIG. 2 schematically shows the transformation component from FIG. 1 in more detail.

The measured stator currents $i_{sx}, i_{sy}$ as well as the applied stator voltages $V_{sx}, V_{sy}, V_s$, may be provided in a stationary three-phase xyz coordinate system. Prior to calculating the estimated rotor flux $\tilde{\Psi}_{mfdq}$, the measured stator currents $i_{sx}, i_{sy}$ and the applied stator voltages $V_{sx}, V_{sy}, V_s$, may be transformed into a stationary orthogonal $\alpha\beta$ coordinate system by a transformation component 130, as illustrated in FIG. 2.

For damping of rotor speed oscillations, the estimated rotor speed $W_r$ is compared with the reference rotor speed $\omega_r^{}$ in a speed comparator 132 which subtracts the estimated rotor speed $\tilde{\omega}_r$ from the reference rotor speed $\omega_r^{}$ to generate a speed error $\omega_e$ as an error signal. The speed error $\omega_e$ is amplified by a torque controller 134, e. g., a PI controller, which generates the reference torque producing current component $i_{sq}^{}$. A limit controller 136 limits the reference torque producing current component $i_{sq}^{}$ according to a given value of the reference magnitude $I_s^*$.

Furthermore, a reference rotor position $\theta_r^*$ is calculated by a position reference generator 138, which may be an integrator for integrating the reference rotor speed $\omega_r^*$. A position comparator 140 subtracts the estimated rotor position $\tilde{\theta}_r$ from the reference rotor position $\theta_r^*$ to generate a position error $\theta_e$ as an error signal.

The position error $\theta_e$ is input to a reference position corrector 142 which amplifies the position error $\theta_e$ with an appropriate gain factor and outputs a reference rotor speed correction $\omega_c$. The reference position corrector 142 is configured to increase and decrease the reference rotor speed correction $\omega_c$ in the same proportion as the position error $\theta_e$. Alternatively, the reference rotor speed correction $\omega_c$ and the position error $\theta_e$ may be modified in different proportions.

The reference rotor speed correction $\omega_c$ is used by a reference speed corrector 144 to calculate a corrected reference rotor speed $\omega_r^*$, for example, by subtracting the reference rotor speed correction $\omega_c$ from the reference rotor speed $\omega_r^{**}$ as output by the reference speed generator 122. The corrected reference rotor speed $\omega_r^*$ is then input to the position reference generator 138 for calculating the reference rotor position $\theta_r^*$.

The reference rotor speed correction $\omega_c$ is to be understood as an additional rotation of the reference rotor position $\theta_r^*$ towards the estimated rotor position $\tilde{\theta}_r$. This results in faster convergence of $\theta_r^*$ and $\tilde{\theta}_r$ and thus in better oscillation damping and shorter startup time.

To provide the reference current vector during startup, the reference magnetizing current component $i_{sd}^{}$ has to be calculated in addition to the reference torque producing current component $i_{sq}^{}$. The reference magnetizing current component $i_{sd}^{**}$ is calculated by a current magnitude limiter 148 based on the reference magnitude $I_s^*$ and the reference torque producing current component $i_{sq}^{}$. For example, the reference magnetizing current component $i_{sd}^{}$, which is orthogonal to component $i_{sq}^{**}$, may be calculated as the square complement to the reference magnitude $I_s^*$ with $i_{sd}^{**}=\sqrt{I_s^{2*}-i_{sq}^{2**}}$. Prior to entering the current magnitude limiter 148, the reference magnitude $I_s^*$ and the reference torque producing current component $i_{sq}^{}$ are each squared in a squaring component 149. The current magnitude limiter 148 then subtracts the squared reference torque producing current component $i_{sq}^{2}$ from the squared reference magnitude $i_s^{2*}$. A square rooting component 150 calculates the reference magnetizing current component $i_{sd}^{}$ from the resulting difference, i. e., the squared reference magnetizing current component $i_{sd}^{2}$.

The reference magnetizing current component $i_{sd}^{}$, the reference torque producing current component $i_{sq}^{}$ and the position error $\theta_e$ are each input to a reference transformation component 151 which is configured to transform the reference magnetizing current component $i_{sd}^{}$ and the reference torque producing current component $i_{sq}^{}$ by the position error $\theta_e$ from a reference rotating orthogonal dq* coordinate system into a rotating orthogonal dq coordinate system aligned with the estimated rotor position $\tilde{\theta}_r$. The resulting corrected reference current vector has a corrected reference magnetizing current component $i_{sd}^*$ and a corrected reference torque producing component $i_{sq}^*$.

A current controller 152 receives both the corrected reference torque producing current component $i_{sq}^*$, and the corrected reference magnetizing current component $i_{sd}^*$. The current controller 152 compares the corrected reference torque producing current component $i_{sq}^*$ to a measured and transformed stator current $i_{sq}$, and the corrected reference magnetizing current component $i_{sd}^*$ to a measured and transformed stator current $i_{sd}$ in order to generate the switching signals $s_1$, $s_2$, $s_3$, as it will be described in more detail in FIG. 5.

For example, the estimated rotor position $\tilde{\theta}_r$ is accepted as correct by the reference positon corrector 142 when the absolute value of the position error $\theta_e$ stays below a given threshold for a certain amount of time. In this case, the reference current generator 118 may ramp the reference magnitude $I_s^*$ to a value used as an initial value for a normal operation control scheme. This initial value may be equal to the reference torque producing current component $i_{sq}^{**}$ generated by the torque controller 134. After that, the startup procedure is considered as successfully finished and the controller 106 switches to a closed-loop torque or speed control mode based on FOC. In this case, the orientation angle of the rotating dq coordinate system changes from the reference rotor position $\theta_r^*$ to the estimated rotor position $\tilde{\theta}_r$. Furthermore, the current references $i_{sd}^*$ and $i_{sq}^*$ are changed to values generated by a torque and flux control loop. In this way, seamless switching from the startup procedure to the normal operation of the synchronous motor 102 may be achieved.

The different components of the controller 106 may be realized in hardware and/or in software. The controller 106 may also comprise a processor and a memory for storing instructions which, when being executed by the processor, may perform the method as described above and below.

FIG. 2 schematically shows the transformation component 130 from FIG. 1 in more detail. The transformation component 130 comprises a first transformation unit 200 for transforming the measured stator currents $i_{sx}$, $i_{sy}$ from the stationary three-phase xyz coordinate system to the stationary orthogonal αβ coordinate system by performing a Clarke transformation. The resulting stator currents $i_{s\alpha}$, $i_{s\beta}$ are then transformed to the rotating orthogonal dq coordinate system by a second transformation unit 202 which performs a Park transformation based on the estimated rotor position $\tilde{\theta}_r$. As a result, the second transformation unit 202 outputs the measured and transformed stator currents $i_{sd}$, $i_{sq}$ which are used by the current controller 152 to generate the switching signals $s_1$, $s_2$, $s_3$ for controlling the electrical energy converter 104.

The transformation component 130 may be configured to transform the applied stator voltages $V_{sx}$, $V_{sy}$ in an analogous manner. The reference transformation component 151 may have only the transformation component 202.

FIG. 3 shows a diagram of a predefined magnitude profile 300, as it may be stored in the reference current generator 118 of FIG. 1. According to this example, the magnitude profile 300 comprises a first portion 302 in the form of a rising curve. The first portion 302 transitions into a constant second portion 304 in the form of a horizontal line. Alternatively, the reference magnitude profile 300 may only comprise the rising curve. The rising curve may be a linear or non-linear function.

FIG. 4 shows a diagram of a predefined rotor speed profile 400, as it may be stored in the reference speed generator 122 of FIG. 1. According to this example, the rotor speed profile 400 has the form of a rising curve, which may be linear or non-linear function for ramping the reference rotor speed $\omega_r^{**}$ from a predefined minimum up to a predefined maximum.

Figure 5:
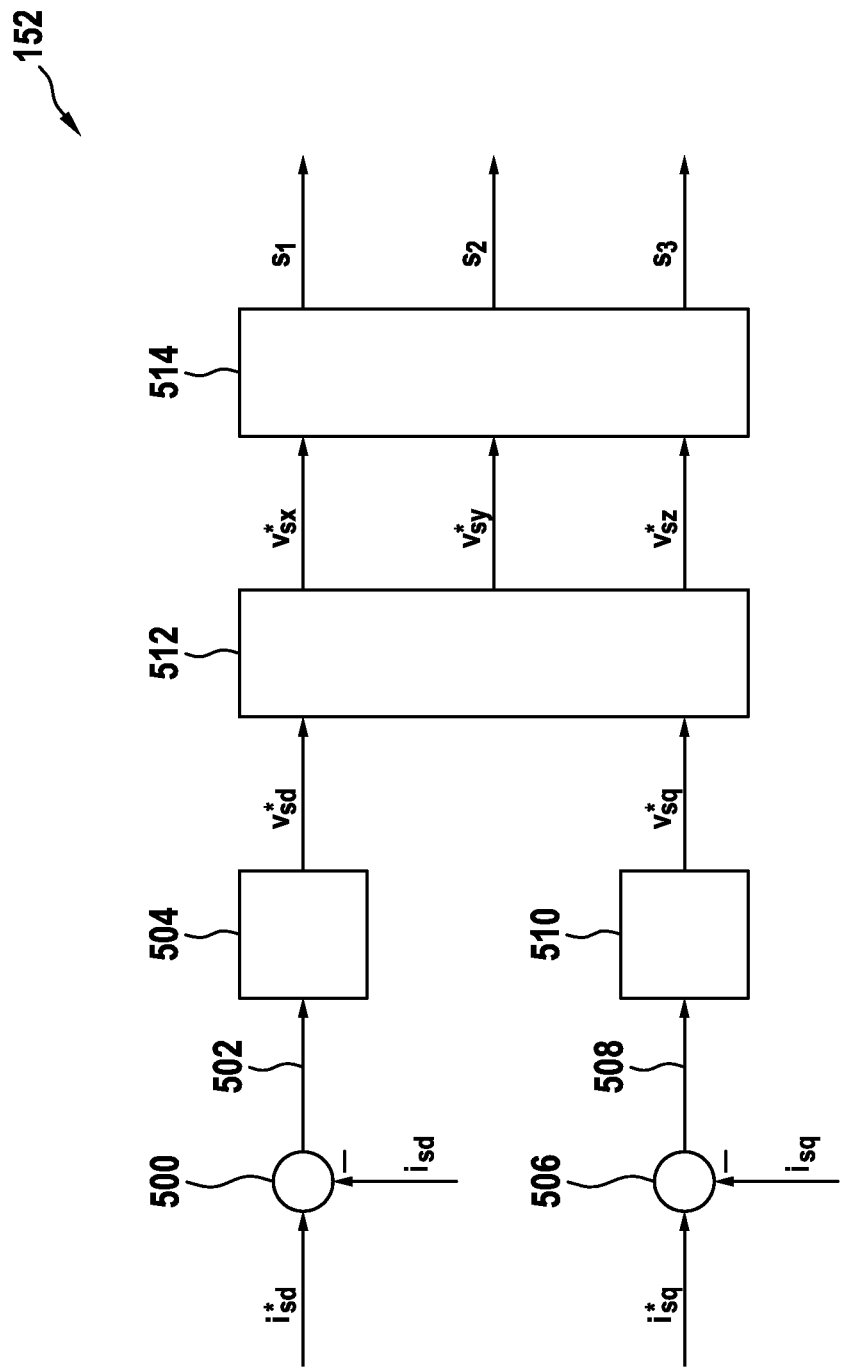
FIG. 5 schematically shows the current controller from FIG. 1 in more detail.

FIG. 5 schematically shows the current controller 152 from FIG. 1 in more detail. The current controller 152 comprises a first current comparator 500 for generating a first error signal 502 by subtracting $i_{sd}$, as generated by the transformation component 130, from $i_{sd}^*$, as generated by the reference transformation component 151. The first error signal 502 is amplified by a first PI controller 504 to generate a reference d-component voltage $V_{sd}^*$.

Furthermore, the current controller 152 comprises a second current comparator 506 for generating a second error signal 508 by subtracting $i_{sq}$, as generated by the transformation component 130, from $i_{sq}^*$, as generated by the reference transformation component 151. The second error signal 508 is amplified by a second PI controller 510 to generate a reference q-component voltage $V_{sq}^*$. A voltage transformation component 512 is configured to transform the reference d-component voltage $V_{sd}^*$ and the reference q-component voltage $V_{sq}^*$ into the stationary three-phase xyz coordinate system by inverse Park and Clarke transformations. The resulting three reference stator voltages $V_{sx}^*$, $V_{sy}^*$, $V_{sz}^*$ are to be applied to the stator windings 110. To achieve this, the reference stator voltages $V_{sx}^*$, $V_{sy}^*$, $V_{sz}^*$ are input to a modulation component 514 configured to generate the switching signals $s_1$, $s_2$, $s_3$ by pulse-width modulating the stator voltages $V_{sx}$, $V_{sy}$, $V_{sz}$, each of the switching signals $s_1$, $s_2$, $s_3$ corresponding to one modulated voltage. The stator voltages $V_{sx}$, $V_{sy}$, $V_{sz}$ may be modulated with a space vector modulation algorithm implemented in the modulation component 514.

Figure 6:
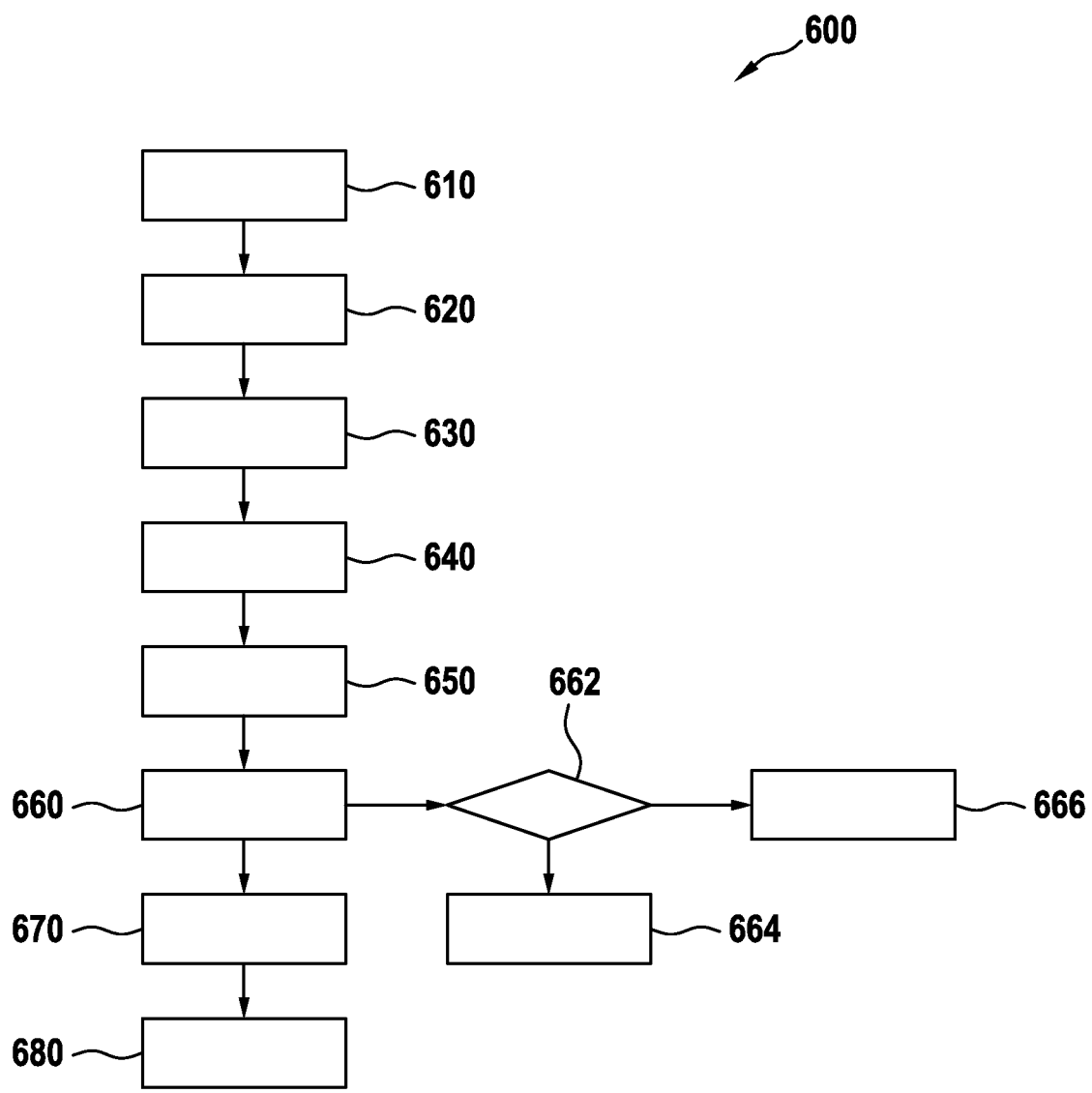
FIG. 6 shows a flow diagram of a method for starting a synchronous motor according to an embodiment of the invention.

FIG. 6 shows a flow diagram of a method 600 for starting the synchronous motor 102 from FIG. 1 without a position and speed sensor.

In a step 610, the stator voltages $V_{sx}$, $V_{sy}$, $V_s$, are applied to the stator windings 110.

In a step 620, the resulting stator currents $i_{sx}$, $i_{sy}$ are measured in the stator windings 110.

In a step 630, the measured stator currents $i_{sx}$, $i_{sy}$ as well as the applied stator voltages $V_{sx}$, $V_{sy}$, $V_{sz}$ are used to estimate the rotor position $\tilde{\theta}_r$ and the rotor speed $\tilde{\omega}_r$ based on back-EMF created by rotation of the rotor 112.

In a step 640, the estimated rotor speed $\tilde{\omega}_r$ is compared with the reference rotor speed $\omega_r^{**}$ to determine the speed error $\omega_e$.

In a step 650, the speed error $\omega_e$ is used to determine the reference torque producing current component $i_{sq}^{**}$.

In a step 660, the estimated rotor position $\tilde{\theta}_r$ is subtracted from the reference rotor position $\theta_r^*$ to determine the position error $\theta_e$. The reference rotor position $\theta_r^*$ is determined from the corrected reference rotor speed $\omega_r^*$, e.g., by integration of the corrected reference rotor speed $\omega_r^*$. The corrected reference rotor speed $\omega_r^*$ is calculated based on the reference rotor speed $\omega_r^{**}$ by subtracting the reference rotor speed correction $\omega_c$ which is calculated based on the position error $\theta_e$. It may be that an absolute value of the position error $\theta_e$ is compared to a predefined threshold value in an optional step 662. When the absolute value of the position error $\theta_e$ is smaller than the threshold value for at least a predefined period of time, the reference rotor position $\theta_r^*$ is set to a value of the estimated rotor position $\tilde{\theta}_r$ in an optional step 664. This may be achieved by setting the position error $\theta_e$ and the reference rotor speed correction $\omega_c$ to zero. Also, the magnitude of the reference current vector may be changed to an appropriate initial value for normal operation of the synchronous motor 102 to ensure smooth transition to a closed-loop torque or speed control mode.

On the other hand, when the absolute value of the position error $\theta_e$ is equal to or greater than the threshold value, the reference rotor speed correction $\omega_c$ may be calculated based on the position error $\theta_e$ in an optional step 666 to minimize the position error $\theta_e$ in a further correction loop. In other words, the greater the position error $\theta_e$, the greater the reference rotor speed correction $\omega_c$, and vice versa. Briefly summarized, the reference rotor position $\theta_r^*$ may be corrected in the direction of the estimated rotor position $\tilde{\theta}_r$ by changing the reference rotor speed $\omega_r^*$ accordingly.

In a step 670, the reference current vector modified with the reference torque producing current component $i_{sq}^{**}$ is transformed from the reference dq* coordinate system by the position error $\theta_e$ into the dq coordinate system which is aligned with the estimated rotor position $\tilde{\theta}_r$. In other words, once the position error $\theta_e$ is accepted as correct, e. g., set to zero, the reference rotor position $\theta_r^*$ is identical to the estimated rotor position $\tilde{\theta}_r$.

In a step 680, the switching signals $s_1$, $s_2$, $s_3$ are generated based on the corrected reference current vector components $i_{sd}^*$ and $i_{sq}^*$.

During startup of the synchronous motor 102, the reference magnitude $I_s^*$ may be changed from a specified minimum value up to a specified maximum value and kept constant until the estimated rotor position $\tilde{\theta}_r$ is accepted as correct. Then, the reference magnitude $I_s^*$ may be changed to a value defined as an initial value for a torque controller. Also during startup, the reference rotor speed $\omega_r^{**}$ may be changed from a specified minimum value up to a specified maximum value.

Figure 7:
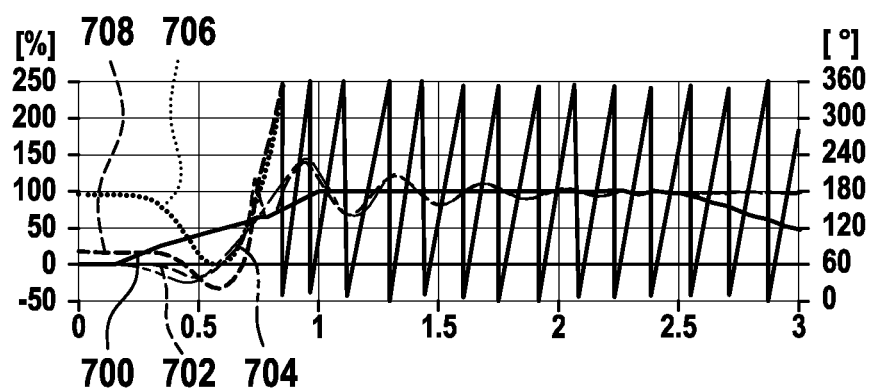
FIG. 7 shows a diagram of different drive signals with disabled reference rotor speed correction according to an embodiment of the invention.

FIG. 7 depicts a timing chart to illustrate oscillations of the rotor speed of the synchronous motor 102 from FIG. 1 when started from standstill with disabled reference rotor speed correction. The timing chart shows a curve 700 of a motor current, a curve 702 of an estimated motor speed, a curve 704 of a measured motor speed, a curve 706 of a measured rotor position, and a curve 708 of an estimated rotor position. One can clearly see rotor speed oscillations during starting, which last about 2.3 s.

Figure 8:
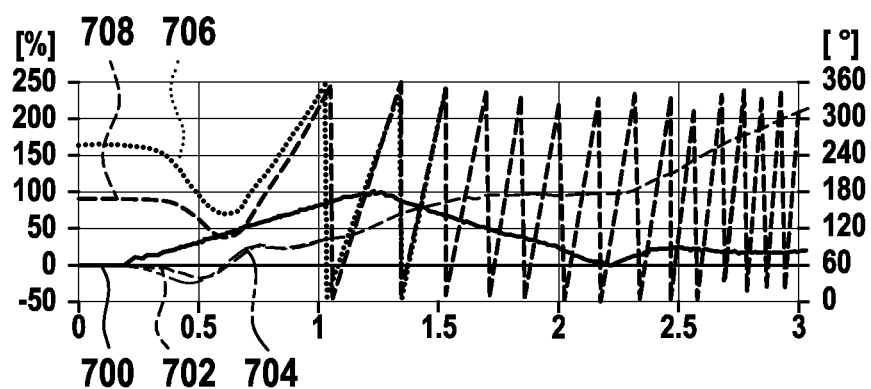
FIG. 8 shows a diagram of different drive signals with enabled reference rotor speed correction according to an embodiment of the invention.

FIG. 8 depicts a timing chart to illustrate the effectiveness of the oscillation damping when the synchronous motor 102 from FIG. 1 is started from standstill with enabled reference rotor speed correction. The parameters shown are the same as in FIG. 7. Oscillations are almost completely damped. The starting time is reduced to about 1 s. This may be the point where the controller 106 switches to normal operation mode, e. g., closed-loop torque or speed control of the synchronous motor 102.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 100 electric drive system
102 synchronous motor
104 electrical energy converter
106 controller
108 stator
110 stator winding
112 rotor
114 permanent magnet
116 electrical grid
118 reference current generator
122 reference speed generator
124 estimator block
126 rotor flux estimator
128 rotor position estimator
130 transformation component
132 speed comparator
134 torque controller
136 limit controller
138 position reference generator
140 position comparator
142 reference position corrector
144 reference speed corrector
148 stator current magnitude limiter
149 squaring component
150 square rooting component
151 reference transformation component
152 current controller
200 first transformation unit
202 second transformation unit
300 reference magnitude profile
302 rising portion
304 constant portion
400 reference speed profile
500 first current comparator
502 first error signal
504 first PI controller
506 second current comparator
508 second error signal
510 second PI controller
512 voltage transformation component
514 modulation component
600 method for starting a synchronous motor
610 applying stator voltages
620 measuring stator currents
630 calculating an estimated rotor speed and an estimated rotor position
640 calculating a speed error
650 determining a reference torque producing current component
660 calculating a position error
662 comparing the position error to a threshold value
664 using the estimated rotor position as the reference rotor position
666 changing a magnitude of a reference current vector and/or a reference rotor speed
670 correcting the reference current vector
680 determining switching signals
700 curve of a motor current
702 curve of an estimated motor speed
704 curve of a measured motor speed
706 curve of a measured rotor position
708 curve of an estimated rotor position
dq rotating orthogonal coordinate system
$i_{s\alpha}$ transformed stator current
$i_{s\beta}$ transformed stator current
$i_{sd}$ transformed stator current
$i_{sq}$ transformed stator current
$i_{sx}$ measured stator current
$i_{sy}$ measured stator current $i_{sd}$** reference magnetizing current component
$i_{sq}$** reference torque producing current component
[$i_{sd}$ $i_{sq}$] reference current vector
$i_{sd}$* corrected reference magnetizing current component
$i_{sq}$* corrected reference torque producing current component
[$i_{sd}$* $i_{sq}$*] corrected reference current vector
$I_s$* magnitude of the reference current vector
$s_1$ switching signal
$s_2$ switching signal
$s_3$ switching signal
t time
$V_{cc}$ supply voltage
$V_{sd}$* reference d-component voltage
$V_{sq}$* reference q-component voltage
[$V_{sd}$* $V_{sq}$*] reference voltage vector
[$V_{sx}$* $V_{sy}$* $V_{sz}$*] transformed reference voltage vector
$V_{sx}$ applied stator voltage
$V_{sy}$ applied stator voltage
$V_{sz}$ applied stator voltage
$V_{sx}$* reference stator voltage, reference phase voltage
$V_{sy}$* reference stator voltage, reference phase voltage
$V_{sz}$* reference stator voltage, reference phase voltage
xyz stationary three-phase coordinate system
αβ stationary orthogonal coordinate system
$\tilde{\Psi}_{mfdq}$ estimated rotor flux
$\theta_e$ position error
$\theta_r$* reference rotor position
$\theta_r$ estimated rotor position
$\omega_c$ reference rotor speed correction
$\omega_e$ speed error
$\omega_r$* corrected reference rotor speed
$\omega_r$** reference rotor speed
$\tilde{\omega}_r$ estimated rotor speed

The invention claimed is:

1. A method for starting a synchronous motor, the synchronous motor comprising a rotor for creating a first magnetic field and a stator with stator windings connected to an electrical energy converter for converting a supply voltage into a stator voltage to be applied to the stator windings to create a rotating second magnetic field interacting with the first magnetic field, the method comprising:
applying reference stator voltages to the stator windings, wherein the reference stator voltages are determined from a reference current vector and a reference rotor speed;
measuring stator currents in the stator windings;
calculating an estimated rotor speed and an estimated rotor position of the rotor from the applied reference stator voltages and the measured stator currents;
calculating a speed error by subtracting the estimated rotor speed from the reference rotor speed;
determining a reference torque producing current component from the speed error;
modifying the reference current vector with the reference torque producing current component;
calculating a position error by subtracting the estimated rotor position from a reference rotor position, wherein the reference rotor position is determined from the reference rotor speed and a reference rotor speed correction, wherein the reference rotor speed correction increases and decreases with the position error, wherein the reference rotor speed correction is subtracted from the reference rotor speed to determine a corrected reference rotor speed, and
wherein the reference rotor position is determined by integrating the corrected reference rotor speed;
correcting the reference current vector by transforming the reference current vector into a corrected reference current vector by the position error, wherein a rotating coordinate system of the corrected reference current vector is aligned with the estimated rotor position;
determining switching signals for the electrical energy converter from the reference stator voltages; and
applying the switching signals to the electrical energy converter.

2. The method of claim 1, further comprising:
determining from the position error whether the estimated rotor position is accepted as correct or not,
when the estimated rotor position is accepted as correct: using the estimated rotor position as the reference rotor position and changing a magnitude of the reference current vector to an initial value for normal operation of an electric drive system comprising the synchronous motor; and/or
when the estimated rotor position is not accepted as correct: changing the magnitude of the reference current vector according to a predefined magnitude profile and/or changing the reference rotor speed according to a predefined rotor speed profile.

3. The method of claim 2,
wherein an absolute value of the position error is compared to a predefined threshold value, and
wherein the estimated rotor position is accepted as correct when the absolute value of the position error stays below the predefined threshold value for a predefined time period.

4. The method of claim 3, further comprising:
determining a reference magnetizing current component from the reference torque producing current component and a reference magnitude of the reference current vector; and
modifying the reference current vector with the reference magnetizing current component.

5. The method of claim 4, wherein the reference magnetizing current component is calculated with:

$$i_{sd}^{**} = \sqrt{I_s^{2*} - i_{sq}^{2**}}$$

6. The method of claim 5, wherein the reference rotor speed correction is determined as a function of the position error.

7. The method of claim 6, wherein the reference torque producing current component is determined dependent on the reference magnitude of the reference current vector.

8. The method of claim 7, further comprising:
determining a reference voltage vector from the corrected reference current vector and the measured stator currents;
transforming the reference voltage vector into a stationary three-phase coordinate system; and
determining the switching signals by pulse-width modulating phase voltages of the transformed reference voltage vector.

9. The method of claim 1, further comprising:
determining a reference magnetizing current component from the reference torque producing current component and a reference magnitude of the reference current vector; and
modifying the reference current vector with the reference magnetizing current component.

10. The method of claim 9, wherein the reference magnetizing current component is calculated with:

$$i_{sd}^{**} = \sqrt{I_s^{2*} - i_{sq}^{2**}}$$

11. The method of claim 10, wherein the reference rotor speed correction is determined as a function of the position error.

12. The method of claim 1, wherein the reference rotor speed correction is determined as a function of the position error.

13. The method of claim 1, wherein the reference torque producing current component is determined dependent on a reference magnitude of the reference current vector.

14. The method of claim 1, further comprising:
determining a reference voltage vector from the corrected reference current vector and the measured stator currents;
transforming the reference voltage vector into a stationary three-phase coordinate system; and
determining the switching signals by pulse-width modulating phase voltages of the transformed reference voltage vector.

15. A computer program for starting a synchronous motor, the synchronous motor comprising a rotor for creating a first magnetic field and a stator with stator windings connected to an electrical energy converter for converting a supply voltage into a stator voltage to be applied to the stator windings to create a rotating second magnetic field interacting with the first magnetic field, which, when executed on a processor, is adapted to start the synchronous motor comprising by directing the processor to:
apply reference stator voltages to the stator windings, wherein the reference stator voltages are determined from a reference current vector and a reference rotor speed;
measure stator currents in the stator windings;
calculate an estimated rotor speed and an estimated rotor position of the rotor from the applied refernece stator voltages and the measured stator currents;
calculate a speed error by subtracting the estimated rotor speed from the reference rotor speed;
determine a reference torque producing current component from the speed error;
modify the reference current vector with the reference torque producing current component;
calculate a position error by subtracting the estimated rotor position from a reference rotor position, wherein the reference rotor position is determined from the reference rotor speed and a reference rotor speed correction, wherein the reference rotor speed correction increases and decreases with the position error,
wherein the reference rotor speed correction is subtracted from the reference rotor speed to determine a corrected reference rotor speed, and
wherein the reference rotor position is determined by integrating the corrected reference rotor speed;
correct the reference current vector by transforming the reference current vector into a corrected reference current vector by the position error, wherein a rotating coordinate system of the corrected reference current vector is aligned with the estimated rotor position;
determine switching signals for the electrical energy converter from the reference stator voltages; and
apply the switching signals to the electrical energy converter.

16. A non-transitory computer-readable medium in which the computer program according to claim 15 is stored.

17. A controller for an electrical energy converter, wherein the controller is adapted to start a synchronous motor, the synchronous motor comprising a rotor for creating a first magnetic field and a stator with stator windings connected to the electrical energy converter for converting a supply voltage into a stator voltage to be applied to the stator windings to create a rotating second magnetic field interacting with the first magnetic field, wherein the controller, to start the synchronous motor, is configured to:
apply reference stator voltages to the stator windings, wherein the reference stator voltages are determined from a reference current vector and a reference rotor speed;
measure stator currents in the stator windings;
calculate an estimated rotor speed and an estimated rotor position of the rotor from the applied reference stator voltages and the measured stator currents;
calculate a speed error by subtracting the estimated rotor speed from the reference rotor speed;
determine a reference torque producing current component from the speed error;
modify the reference current vector with the reference torque producing current component;
calculate a position error by subtracting the estimated rotor position from a reference rotor position, wherein the reference rotor position is determined from the reference rotor speed and a reference rotor speed correction, wherein the reference rotor speed correction increases and decreases with the position error,
wherein the reference rotor speed correction is subtracted from the reference rotor speed to determine a corrected reference rotor speed, and
wherein the reference rotor position is determined by integrating the corrected reference rotor speed;
correct the reference current vector by transforming the reference current vector into a corrected reference current vector by the position error, wherein a rotating coordinate system of the corrected reference current vector is aligned with the estimated rotor position;
determine switching signals for the electrical energy converter from the reference stator voltages; and
apply the switching signals to the electrical energy converter.

18. An electric drive system, comprising:
the controller of claim 17;
the synchronous motor comprising the rotor for creating the first magnetic field and the stator with the stator windings; and
the electrical energy converter connected to the stator windings and adapted to convert the supply voltage into the stator voltage to be applied to the stator windings to create the rotating second magnetic field interacting with the first magnetic field.

* * * * *